United States Patent
Meyer et al.

(10) Patent No.: US 6,571,615 B1
(45) Date of Patent: Jun. 3, 2003

(54) BED FOR TESTING THERMAL FATIGUE IN INTERNAL COMBUSTION ENGINE CYLINDER HEADS, AND ASSOCIATED METHODS

(75) Inventors: Philippe Meyer, Ronquerolles (FR); Frédéric Guimbal, Senlis (FR); Arnauld Dupain, Etrechet (FR)

(73) Assignee: Montupet S.A. (FR)

( * ) Notice: Subject to any disclaimer, the term of this patent is extended or adjusted under 35 U.S.C. 154(b) by 0 days.

(21) Appl. No.: 09/720,578

(22) PCT Filed: Jun. 25, 1999

(86) PCT No.: PCT/FR99/01541
§ 371 (c)(1),
(2), (4) Date: Mar. 19, 2001

(87) PCT Pub. No.: WO00/00807
PCT Pub. Date: Jan. 6, 2000

(30) Foreign Application Priority Data

Jun. 26, 1998 (FR) .............................. 98 08127

(51) Int. Cl.⁷ .................................................. G01M 15/00
(52) U.S. Cl. .................................. 73/119 R; 73/117.1
(58) Field of Search ............................. 73/116, 117.1, 73/119 R; 374/29

(56) References Cited

U.S. PATENT DOCUMENTS

| | | | | |
|---|---|---|---|---|
| 5,007,279 A | | 4/1991 | Miall ........................... | 72/394 |
| 5,195,359 A | * | 3/1993 | Kubota et al. ............... | 374/144 |
| 5,273,359 A | * | 12/1993 | Noel ............................ | 374/29 |
| 5,463,222 A | * | 10/1995 | Lesko et al. ................. | 250/330 |
| 5,922,948 A | * | 7/1999 | Lesko et al. ................. | 73/117.3 |

FOREIGN PATENT DOCUMENTS

| | | | |
|---|---|---|---|
| DE | 19612616 A1 | 3/1996 | ........... F02G/1/043 |
| FR | 2651319 | 1/1991 | ........... G01M/15/00 |
| FR | 2733833 | 3/1995 | ........... G01M/3/10 |
| WO | WO 98/38417 | 3/1998 | ........... F01P/7/16 |

OTHER PUBLICATIONS

Database WPI, Section EI, Week 8626, Derwent Publication Ltd., London GB, Class S02, Nov. 23, 1985.
Database WPI, Section EI, Week 8933 Derwent Publication Ltd., London GB, Class S02, Feb. 23, 1989.
Database WPI, Section EI, Week 8444 Derwent Publication Ltd., London GB, Class S02, Jul. 7, 1983.

* cited by examiner

Primary Examiner—Eric S. McCall
(74) Attorney, Agent, or Firm—Blakely Sokoloff Taylor & Zafman

(57) ABSTRACT

A thermal fatigue test stand for combustion engine cylinder heads. A cylinder head support having at least a cylinder head zone capable of being exposed to the engine combustion. At least one burner for directing a flame on the entire head zone. At least one heat flux sensor located in the cylinder head thickness at the zone to verify whether the heat flux produced by the flame is at least approximately in conformity with a predetermined value. The invention also concerns a method for calibrating such a test stand, and a method for testing cylinder heads. The invention is particularly useful for developing, both from a metallurgical and geometrical viewpoints, aluminum alloy cylinder heads.

12 Claims, 8 Drawing Sheets

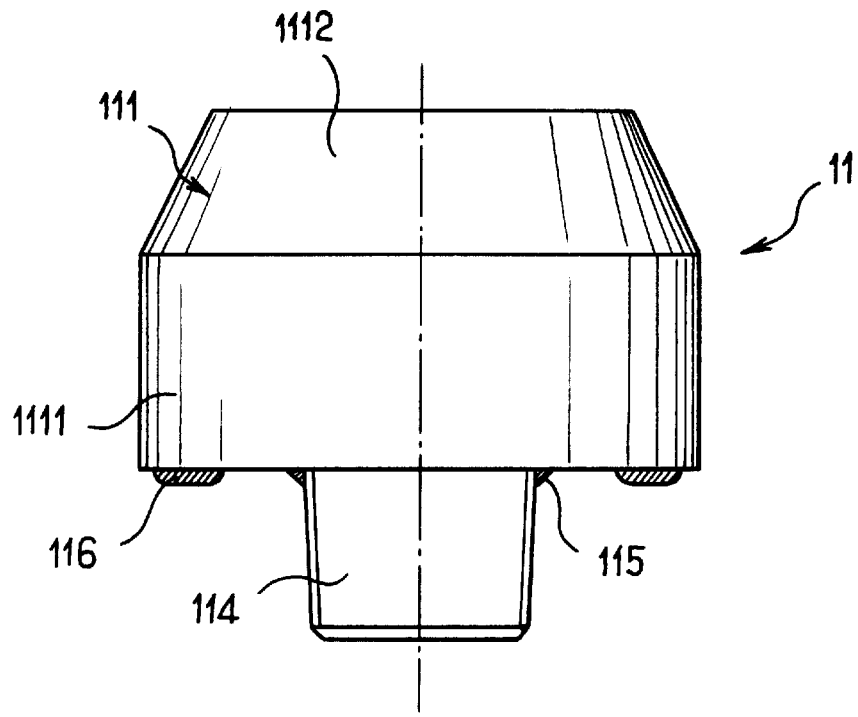
FIG_2a
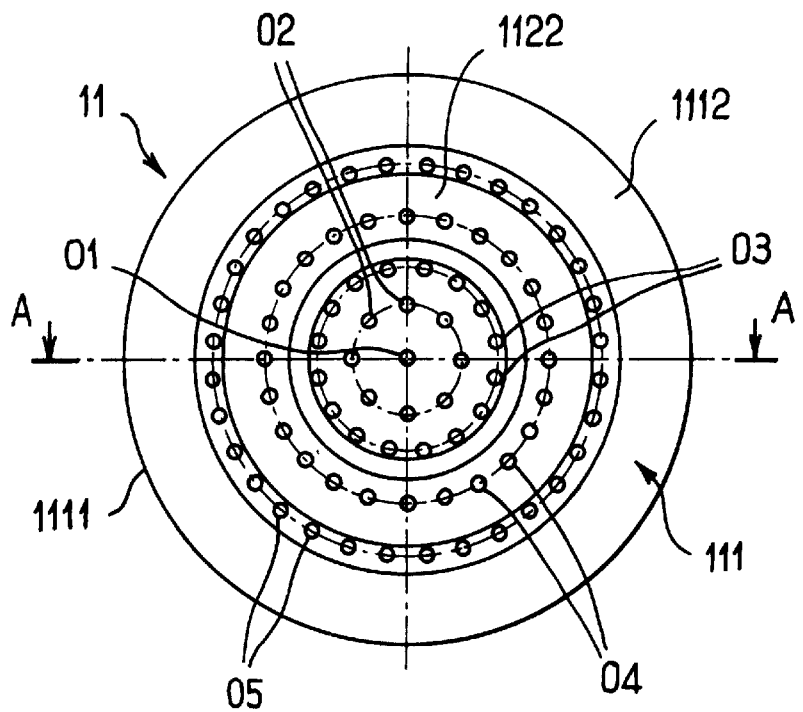
FIG_2b

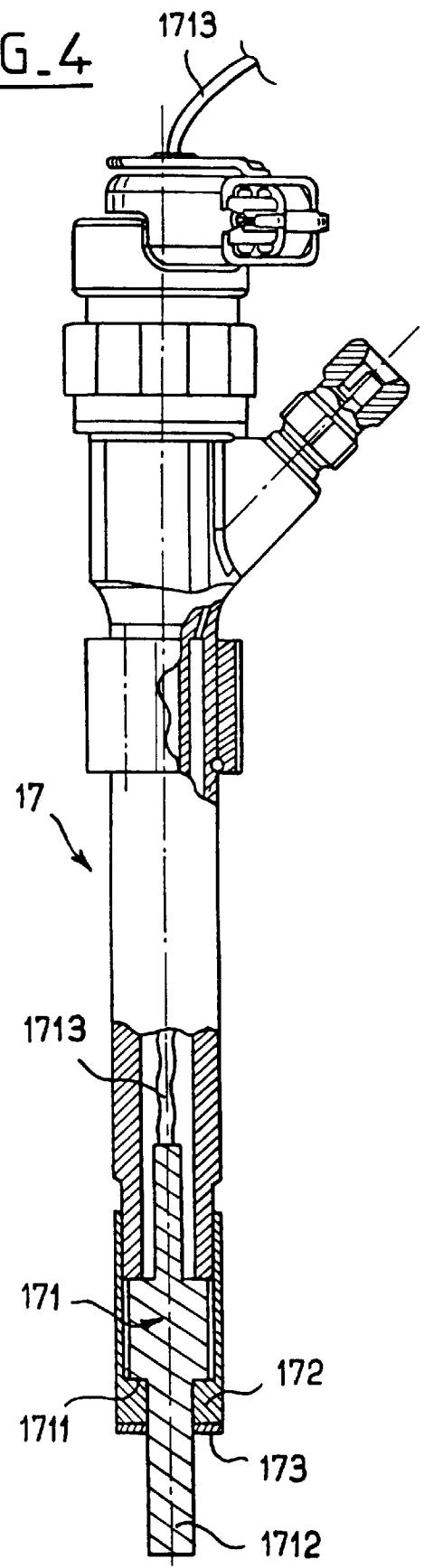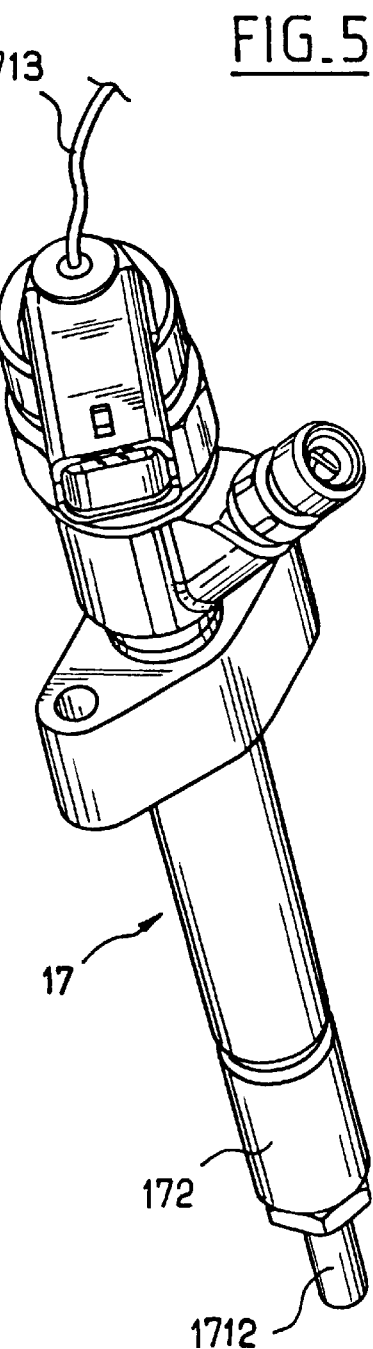

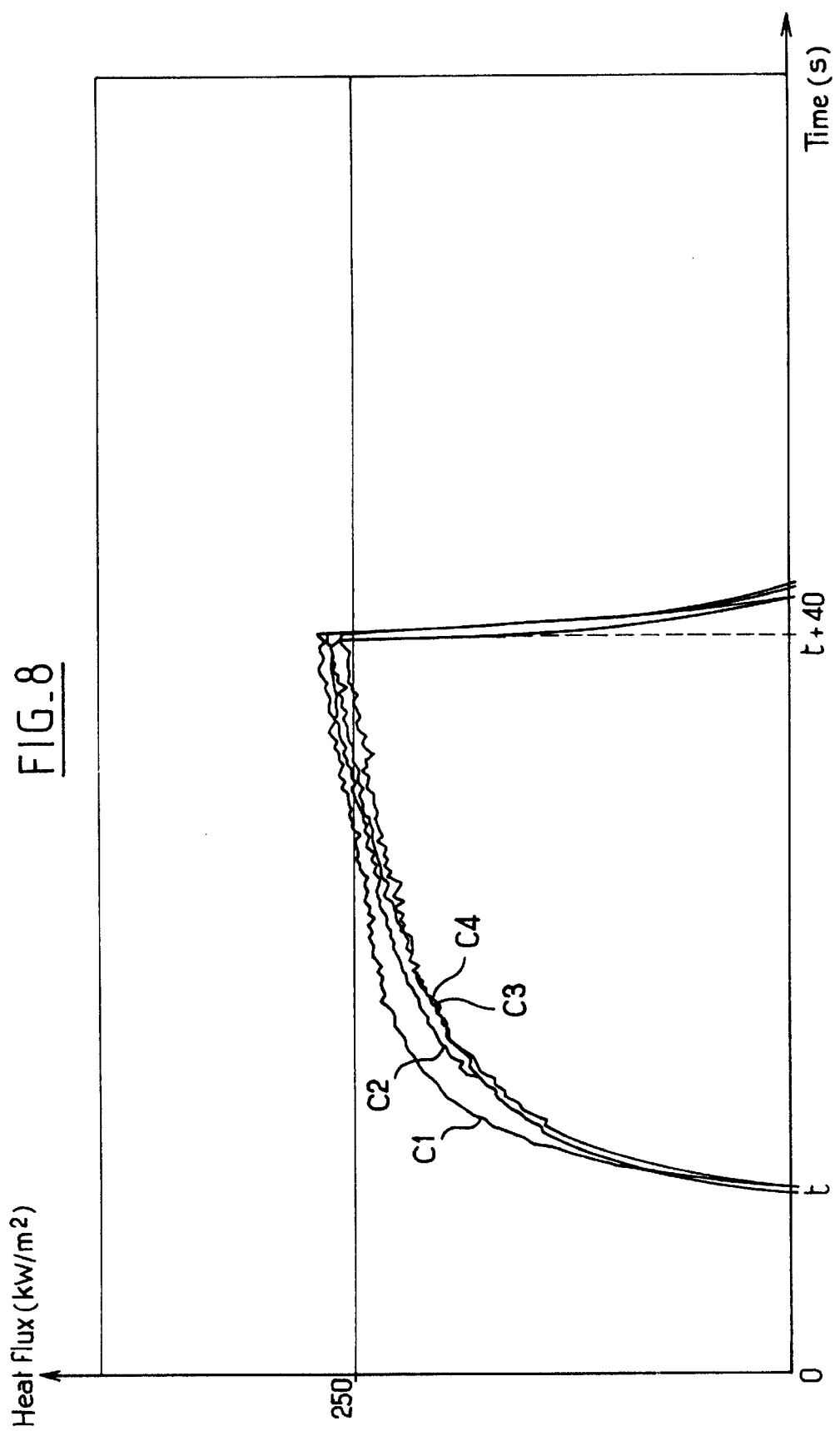

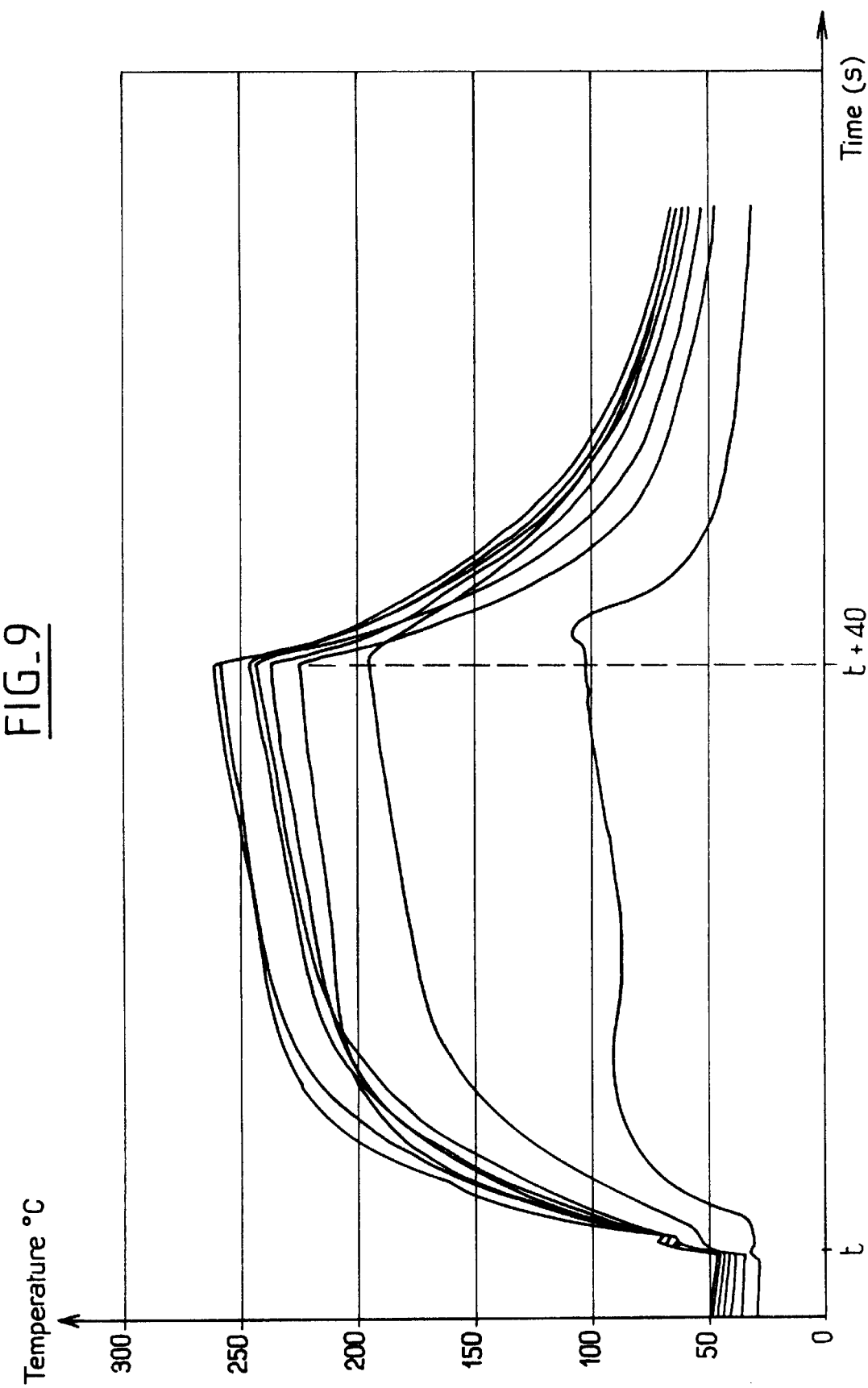
FIG_9

BED FOR TESTING THERMAL FATIGUE IN INTERNAL COMBUSTION ENGINE CYLINDER HEADS, AND ASSOCIATED METHODS

BACKGROUND OF THE INVENTION

The present invention relates to a test bed for testing thermal fatigue, in particular for cylinder heads made of light alloy (typically aluminum alloy) for internal combustion engines, and to a method of fatigue testing such cylinder heads.

At present, developing a new cylinder head includes stages of validation on an engine test bed. The typical duration of a conventional test on the test bed is of the order of 800 hours.

In parallel, manufacturers are nowadays designing engines, in particular diesel engines, in which the cylinder heads are subjected to more and more stress, particularly in terms of the ability they must have to tolerate successive starts and stops, both cold and hot, and the ever increasing power that such engines must deliver.

Thus, test campaigns must simulate such working conditions for the cylinder head which means they become lengthier and lengthier, whereas manufacturers are simultaneously requiring that cylinder head development times should become shorter and shorter.

Various test beds exist at present for subjecting cylinders heads to thermal fatigue testing while reducing the time required for testing by reducing the use of tests on an engine test bed. In theory, such beds serve to heat certain zones on the cylinder head that are exposed to the combustion chambers of the engine in a manner that simulates the behavior of the cylinder head when faced with temperature variations that should be similar to those encountered in real operation, but without requiring testing to be performed on an engine test bed.

A first known test bed is designed to apply localized heating to a zone of the cylinder head which is exposed to combustion, and particularly to the inter-seat bridge zones (i.e. between adjacent valve seats), so that these locations reach temperatures close to engine operating temperatures. The burners used are tetrene-oxygen burners.

Nevertheless, that type of testing is performed with a thermal map over the cylinder head as a whole which is very different from that encountered in real operation, so the results obtained are not sufficiently representative. In use, such a test bed is effective in comparing different metallurgical properties (alloys, grain size, . . . ) but not different geometrical properties (in particular the position of the water that cools the tested zone, and the general shape of the cylinder head).

Another known test bed has burners that are supposed to raise those zones of the cylinder head that are exposed to combustion to temperatures that are substantially equivalent to those obtained on an engine test bed. These temperatures are regulated by means of one thermal couple per zone, with the thermocouple determining the temperature reached on the cylinder head. Nevertheless, by its very principle, that method of regulating heating in terms of temperature cannot serve to compare different cylinder head shapes. For example, if the position of the cooling water is changed in such a manner that the cooling of the heated surfaces is improved, then thermocouple regulation has the effect of applying too much heat so that the temperatures continue to reach the reference value, which is no longer representative of the real operating conditions of the engine.

Finally, a drawback of that known test bed lies in that it is incapable of complying with the temperature differences that exist between certain zones of the cylinder head and others, which can significantly affect the representativeness of test results.

Finally, other test beds are known in which cylinder head heating is performed by induction at the valve seat inserts. It will be understood that that type of test bed does not enable a temperature map to be obtained that is representative of the map obtained on an engine test bed.

Thus, none of the known thermal fatigue test beds enable cylinder head development to be accelerated without requiring very frequent testing on an engine test bed. More particularly, although known test beds can be used to validate metallurgical solutions correctly, it is only by using an engine test bed that geometrical solutions can be tested effectively, even though nowadays it is specifically geometrical solutions that are being researched the most since it is geometrical solutions that make it possible to achieve the most significant advances in terms of improving cylinder head lifetimes.

SUMMARY OF THE INVENTION

The invention seeks to mitigate those limitations of the state of the art and to propose a test bed that enables cylinder heads to be subjected to accelerated thermal fatigue testing while obtaining results that are highly representative (mainly detecting thermal fatigue cracks in the inter-seat bridge zone), and to do so in lengths of time that are significantly shorter than prior solutions (typically 40 hours (h) to 200 h as compared with 800 h.

Another object of the present invention is to provide a thermal fatigue test bed suitable for obtaining a temperature map of the exposed zones in the combustion chambers that is very similar to the map obtained on an engine test bed.

Another object of the invention is to be able to compare cylinder heads not only when they have different metallurgical properties, but also when they have different shapes, particularly in terms of the positioning of cooling water.

Thus, the present invention provides a thermal fatigue test bed for an internal combustion engine cylinder head, characterized in that it comprises in combination:

- a support for a cylinder head possessing at least one cylinder top zone suitable for being normally exposed to combustion in an engine;
- at least one burner suitable for directing a flame onto said zone as a whole; and
- at least one heat flux sensor situated in the thickness of said cylinder head in said zone to verify that the heat flux produced by the flame complies at least approximately with a predetermined value.

Preferred but non-limiting features of the test bed of the invention are as follows:

- the test bed further comprises a hot cooling liquid circuit and a cold cooling liquid circuit, and means for selectively connecting the cylinder head to one of the two circuits;
- the cooling circuits are controlled so as to reproduce at least approximately real conditions of cooling fluid circulation;
- each burner is fed with a mixture of saturated hydrocarbon gas and oxygen-enriched air;
- the saturated hydrocarbon gas is natural gas;

the test bed further comprises means for adjusting the heat flux supplied by the burners by adjusting the quantities of gas and of oxygen-enriched air in the mixture;

the flux from each burner is adjusted on a respective reference value;

said reference value is selected in such a manner as to generate a temperature map at various points of the cylinder head similar to that obtained under real operating conditions and as measured by means of a cylinder head fitted with temperature sensors;

each burner is suitable for generating a distributed flame capable of producing said temperature map in the associated cylinder top zone;

each burner possesses a perforated plate having a predetermined distribution of orifices;

said distribution is non-uniform; and each heat flux sensor is mounted at the end of a fuel injector suitable for mounting in the cylinder head, said end being adapted to receive said sensor.

In a second aspect, the invention provides a method of calibrating a thermal fatigue test bed for internal combustion engine cylinder heads, the method being characterized in that it comprises the following steps:

providing a set of temperature sensors in a cylinder head fitted with instruments, said sensors being in the vicinity of at least one zone that is to be exposed to engine combustion;

using the temperature sensors while the cylinder head is in operation on an engine test bed to determine a temperature map for said zone under steady conditions;

storing said temperature map;

mounting a heat flux sensor in said zone of the cylinder head fitted with instruments;

placing the cylinder head fitted with instruments on a thermal fatigue test bed fitted with a plurality of burners;

adjusting the heat flux delivered by each burner to recreate at least approximately said stored temperature map; and storing the heat flux value measured after adjustment as a reference value.

Preferred features of this method are as follows:

at least one heat flux sensor is provided per cylinder top zone, and a reference value is stored for each burner/sensor pair;

while the cylinder head is on the thermal fatigue test bed, the time required for the measured temperature map to stabilize is determined; and the step of adjusting the heat flux comprises a step of adjusting the shape of the burner and a step of adjusting the fuel mixture supplied to the burner.

Finally, the invention also provides a method of testing thermal fatigue of an internal combustion engine cylinder head, the method being characterized in that it comprises the following steps:

providing a thermal fatigue test bed calibrated by the method as defined above;

placing the cylinder head on said test bed; and alternating heating stages with heat flux adjusted on said reference value(s) and cooling stages, of predetermined durations.

Preferred features of this method are as follows:

the heat flux that can be delivered by each burner is greater than about 250 kilowatts per square meter ($kW/m^2$);

the duration of the heating stages and of the cooling stages lies in the range about 20 seconds (s) to about 100 s: and it further comprises the steps consisting in:
connecting the cylinder head to a hot cooling liquid circuit during the heating stages; and
connecting the cylinder head to a cold cooling liquid circuit during the cooling stages.

Other aspects, objects, and advantages of the present invention will appear more clearly on reading the following detailed description of a preferred embodiment, given by way of non-limiting example and made with reference to the accompanying drawings, in which:

BRIEF DESCRIPTION OF THE DRAWINGS

FIG. 2a is a side view of a burner used in the FIG. 1 test bed;

FIG. 2b is a face view of the FIG. 2a burner;

FIG. 3b is a cross-section view on line B—B of FIG. 3a;

FIG. 4 is a side elevation view of a heat flux sensor and its support as used by the test bed;

FIG. 5 is a perspective view of the heat flux sensor and its support;

FIG. 8 is a graph showing how the heat flux delivered to each zone of the chamber of the cylinder head under test varies during a fatigue test cycle; and FIG. 9 is a graph showing how temperature varies at different points on the cylinder head during such a fatigue test cycle, on a given cylinder head

DETAILED DESCRIPTION OF THE INVENTION

Figure 1:
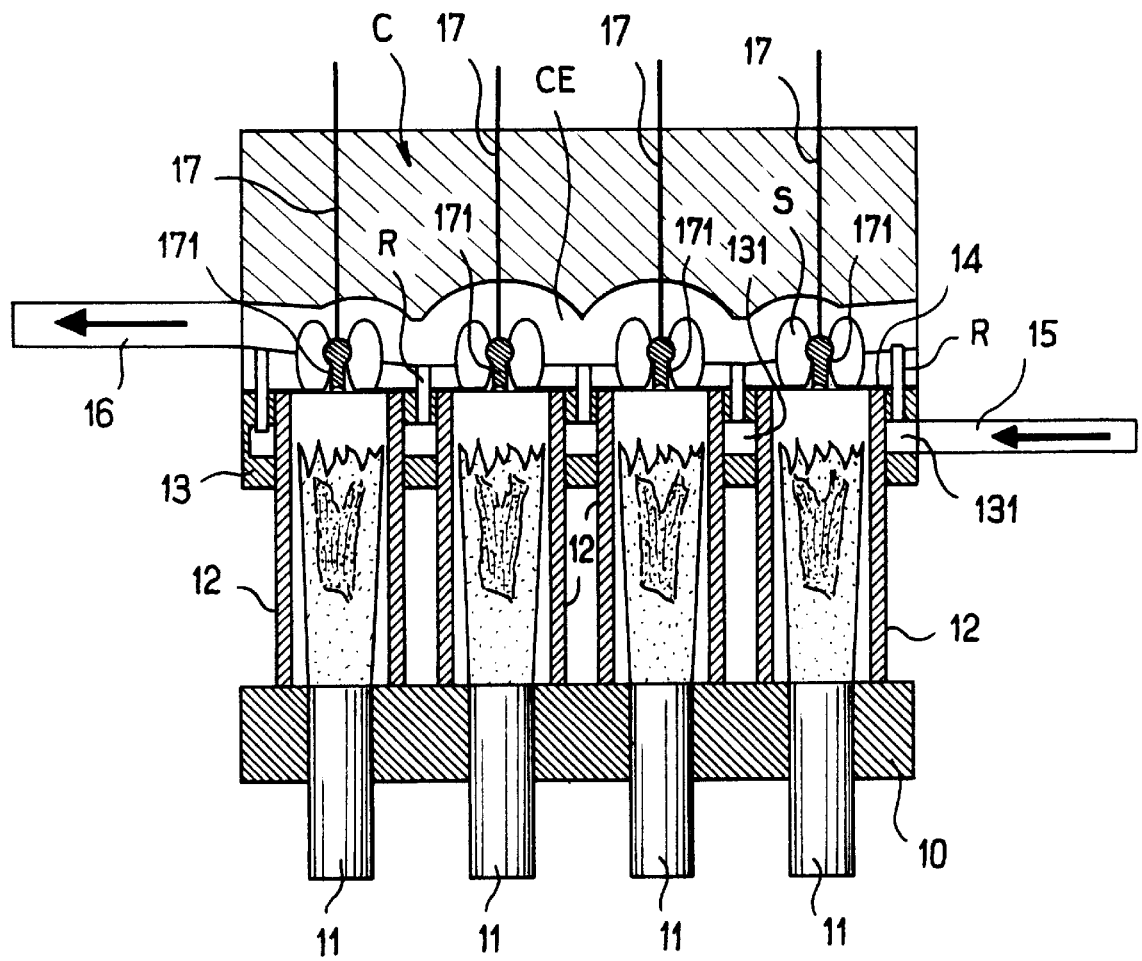
FIG. 1 is a simplified diagram in lateral elevation of a thermal fatigue test bed of the invention.

With reference initially to FIG. 1, there is shown a thermal fatigue test bed for a cylinder head C. The test bed comprises at its base a support plate 10 for a set of burners 11 in number equal to the number of cylinders in the engine for which the cylinder head is designed (in this case four in line). Four cylindrical sleeves 12 are mounted above the support plate 10 to channel heat delivered by burners 11 upwards towards the cylinder head. At their top ends, the sleeves 12 meet an interface plate 13 having a set of circular through passages for the sleeves, and possessing a plane top face against which the cylinder head is placed with a conventional cylinder head gasket 14 being interposed.

In conventional manner, the cylinder head C has a duct CE for water or other cooling liquid passing close to its valve seats. In addition, the interface plate 13 has a cooling water duct 131 in its thickness. These water ducts CE and 131 are connected to each other on either side of the zone in the vicinity of the top of each cylinder by couplings R which are defined in part by the structure of the cylinder head, and they are thus connected together to a water inlet duct 15 and to a water outlet duct 16. The test bed is also fitted with a circuit (not shown) for the water or other cooling liquid, which circuit has a first circuit for cold liquid and an independent second circuit for hot liquid, together with means based on solenoid valves, for example, to couple the test bed selectively to the hot circuit or to the cold circuit, as described in detail below.

Means (not shown) are also provided to control or at least monitor these circuits so as to apply cooling liquid to the cylinder head under conditions that are as close as possible to those encountered in real operation, particularly in terms of flow rate, flow speed, temperature, pressure, and distribution (in particular complying with the shapes and flow directions concerning liquid reaching the cylinder head and liquid leaving it).

As described in detail below, a set of heat flux sensors (one per cylinder) is mounted in the cylinder head via the passages for receiving fuel injectors, and the supports for these sensors are represented diagrammatically by references 17 with the sensors themselves be represented by references 171.

FIG. 1 also shows diagrammatically the valve seats S in the cylinder head C.

Figure 3A:
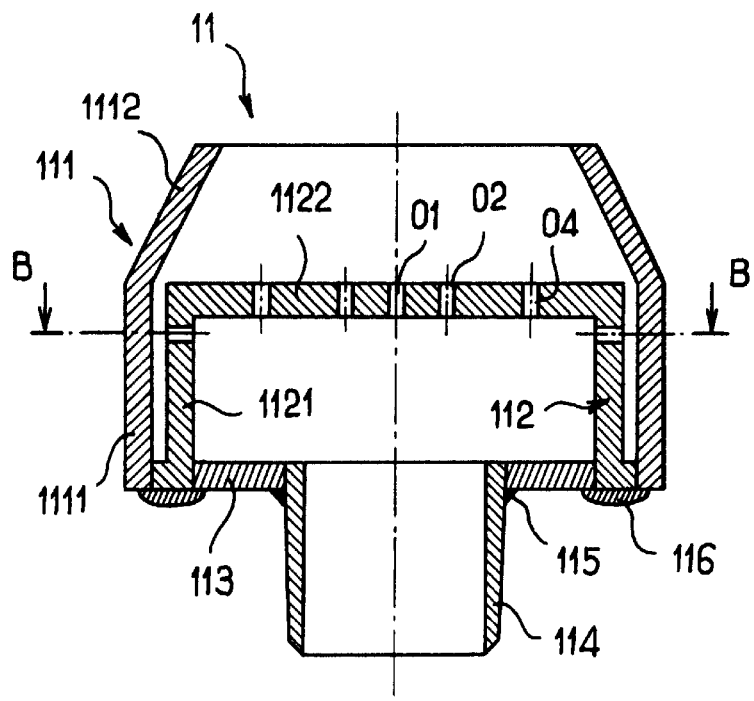
FIG. 3a is an axial section view of the burner on line A—A of FIG. 2b.
Figure 3B:
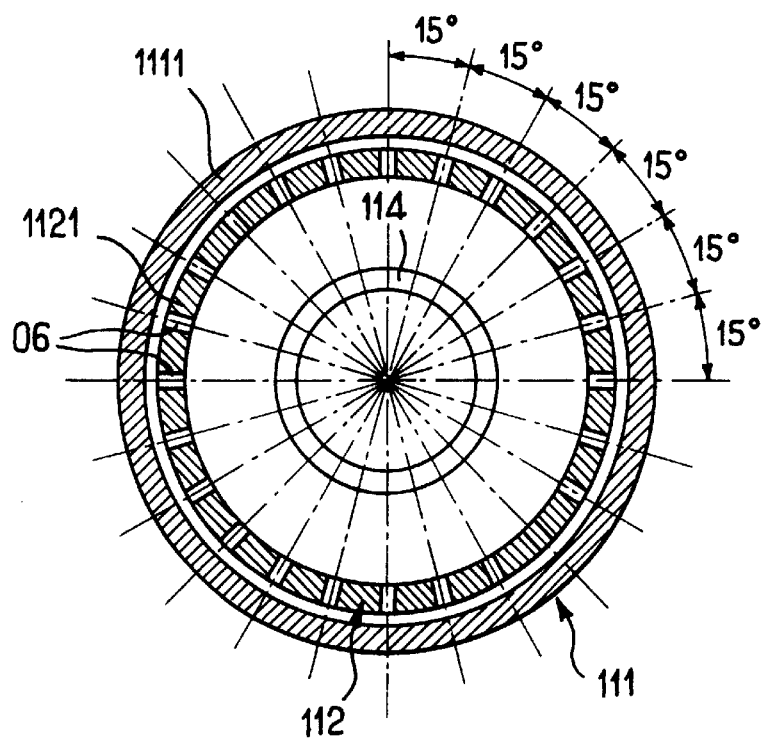

The burners used for delivering a controlled heat flux to the zones of the cylinder head that are to be exposed to the combustion chambers of the engine (referred herein as the "top" zones of the cylinders) are described below with reference to FIGS. 2 and 3.

Firstly, in general terms, the Applicant has discovered that it is possible, in the top zone of a cylinder, to reach the high temperatures required for properly simulating real operating conditions in lengths of time that make it possible to reduce very significantly the time required for a test campaign and thus for development, by using burners of a special shape that are fed with a suitably devised mixture of a saturated hydrocarbon gas, in particular natural gas, and oxygen-enriched air, whereas prior art burners generally serve only to heat very localized regions in the top zone of the cylinder or serve to obtain temperature rise times that are too long and highly prejudicial for the total duration of a test campaign.

As shown in FIGS. 2a, 2b, 3a, and 3b, each burner 11 is defined by assembling together a set of metal pieces comprising an outer bell 111 having a cylindrical base portion 1111 surmounted by a tapering frustoconical portion 1112 that is open at its top, a perforated piece 112 possessing a cylindrical side wall 1121 surmounted by a circular plate 1122, a ring-shaped link piece 113, and a coupling-forming piece 114 that is cylindrical and of a diameter that is significantly smaller than that of the pieces 111 and 112. These pieces are assembled together by weld fillets 115 and 116.

A plurality of axial orifices O1 to O5 are formed through the circular plate 1122 while a series of radial orifices O6 are formed through the associated cylindrical wall 1121. These orifices receive the mixture of gases under pressure that is delivered via the coupling 114, and the number and distribution of the orifices are adjusted so as to obtain, as explained below, a temperature map for the cylinder head that approximates closely to that encountered under real operating conditions.

In the present example, the plate 1122 has orifices all with a diameter of 2 mm, and they are distributed over concentric circles comprising:

a central orifice O1;
eight orifices O2 regularly distributed around a first circle having a diameter of 15 mm;
sixteen orifices O3 regularly distributed around a second circle having a diameter of 25 mm;
twenty-four orifices O4 regularly distributed around a third circle having a diameter of 40 mm; and
thirty-two orifices O5 regularly distributed around a fourth circle having a diameter of 55 mm.

The side wall 1121 possesses twenty-four orifices O6 that are regularly spaced apart at 15° intervals.

The burners are fed with a mixture of natural gas and oxygen, using a controlled mixer valve as described in detail below so as to vary at will the proportions of natural gas and oxygen and thus the power of the flame.

FIGS. 4 and 5 show a conventional diesel engine injector given overall reference 17 that does not need to be described in detail, and its combustion chamber end is adapted so as to receive a heat flux sensor 171.

This sensor has a shoulder 1711 bearing against an end fixing ring 172 that is mounted on the end of the injector, and a copper gasket 173 is fitted on the outside of the ring.

The sensor proper is received in a cylindrical portion 1712 projecting outwards from the injector and designed to be closely received with extremely well controlled clearance in a bore formed in the cylinder head. To avoid drift, this clearance is preferably kept below 0.1 mm, and more preferably is close to 0.05 mm.

The sensor 171 is connected, via a cable 1713 having a stainless steel sheath, to a computer unit for running a test and acquiring data (described below).

The flux sensors 171 are advantageously dual thermocouple junction sensors manufactured under the reference CFMT by CRMT of 3, chemin de la Brocardière, 69570 Dardilly, France, which are designed specifically to operate in particularly severe environments.

Thus, as already shown diagrammatically in FIG. 1, the cylinder head is fitted with one flux sensor per cylinder, and the signals picked up by these sensors are used for controlling the test bed as described in detail below.

Figure 6:
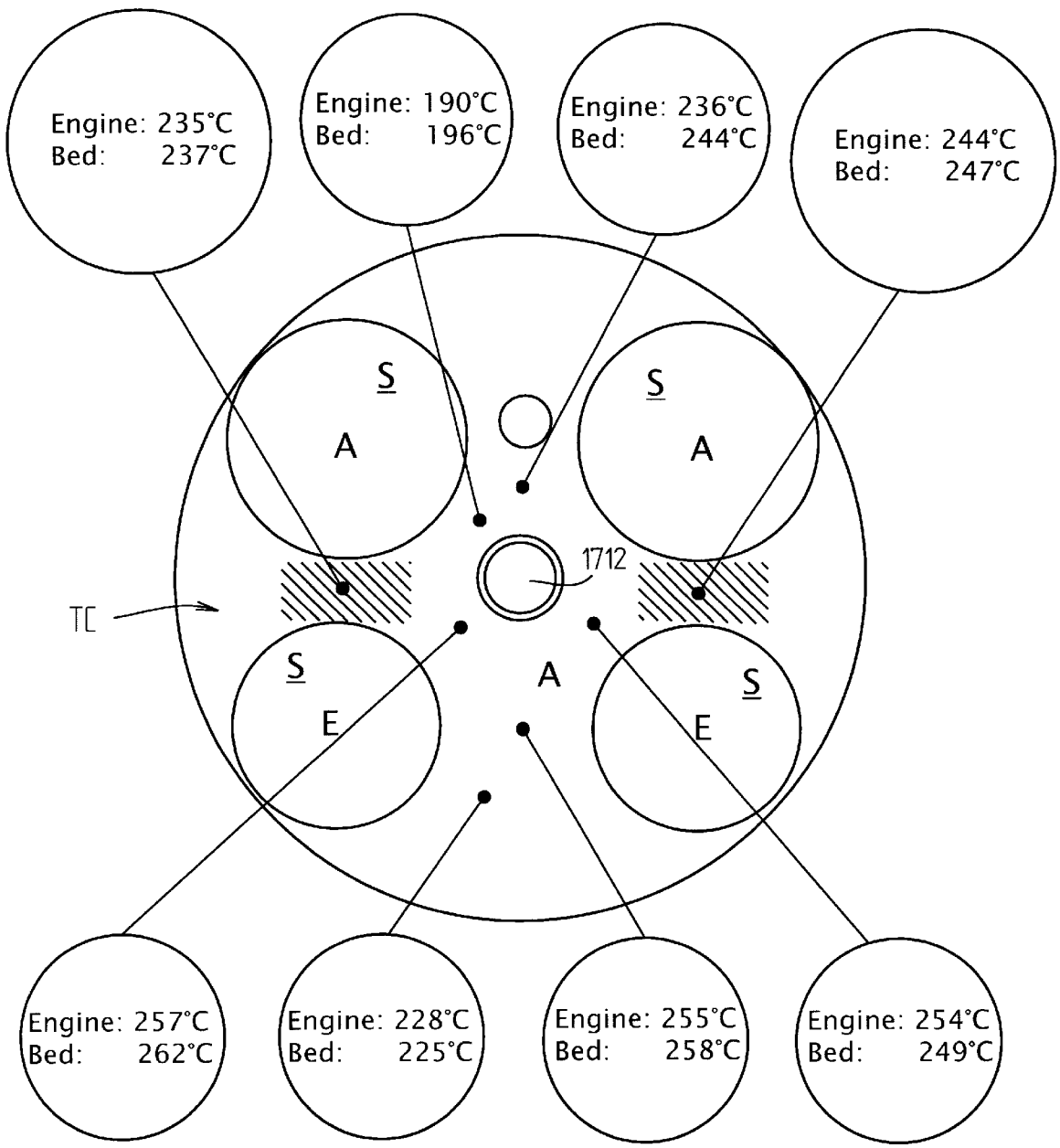
FIG. 6 is a diagrammatic face view of a cylinder head zone that is exposed to a combustion chamber, illustrating the behavior of the test bed in temperature map terms.

FIG. 6 shows a cylinder top zone TC in the cylinder head, provided with four valve seats S (two for admission A and two for exhaust E) plus a bore A for the injector, where the free end of the terminal portion 1712 of the heat flux sensor 171 is flush.

At various predetermined points, this figure shows both the temperatures as measured under predetermined real operating conditions of an engine fitted with the cylinder head, and the temperatures as measured when the cylinder head is heated using the test bed as described above.

These measurements were obtained with a reference or "model" cylinder head that had previously been machined and fitted with instruments using a set of thermocouples disposed so as to be flush at the measurement points in question.

It can be seen in this figure that the temperatures measured in an engine test and the temperatures measured on the test bed of the present invention are close enough for the test bed of the invention to be considered as providing an excellent model of real temperature conditions.

It will be observed at this point that the arrangement of the orifices in each burner, as described above, was devised by successive approximations so as to obtain the temperature map shown. In particular, the positions and the numbers of burner orifices in the central region and in the peripheral region make it possible to ensure that the temperatures marked at the various points in FIG. 6 are complied with to a satisfactory approximation.

In a variant embodiment (not shown), action can also be taken on the diameters of the burner orifices.

The operating cycles of a thermal fatigue test bed of the invention are described below, initially with reference to FIG. 7 which is a block diagram showing how gases are mixed in the test bed, in association with a computer control station SP.

In a manner that is not shown, the station SP receives, for monitoring purposes, electrical signals (voltages) from the four flux sensors 171 via the conductors 1713, which signals are representative of the instantaneous heat flux values in each cylinder top zone of the cylinder head. As a function of these signals, the station SP verifies that the heat flux value measured in association with each burner coincides with a reference value, i.e. departs from said reference value by no more than an acceptable difference, e.g. ±5% to ±10%, and it interrupts the process and informs the operator if the departure becomes abnormal. Advantageously, the respective flow rates in the burners are adjustable between about 0.35 cubic meters per hour ($m^3$/hour) to about 1.15 $m^3$/hour for the natural gas and between about 1.25 $m^3$/hour to about 5.25 $m^3$/hour for the oxygen, the pressure of the natural gas being 4 bars and that of the oxygen being 3 bars.

In addition, the station SP is suitable (in a manner not shown) for controlling the circulation of cooling water (or other liquid) by switching the hot liquid circuit and the cold liquid circuit appropriately and by verifying, where necessary, that the flow rate, flow speed, temperature, and pressure conditions are satisfied.

Figure 7:
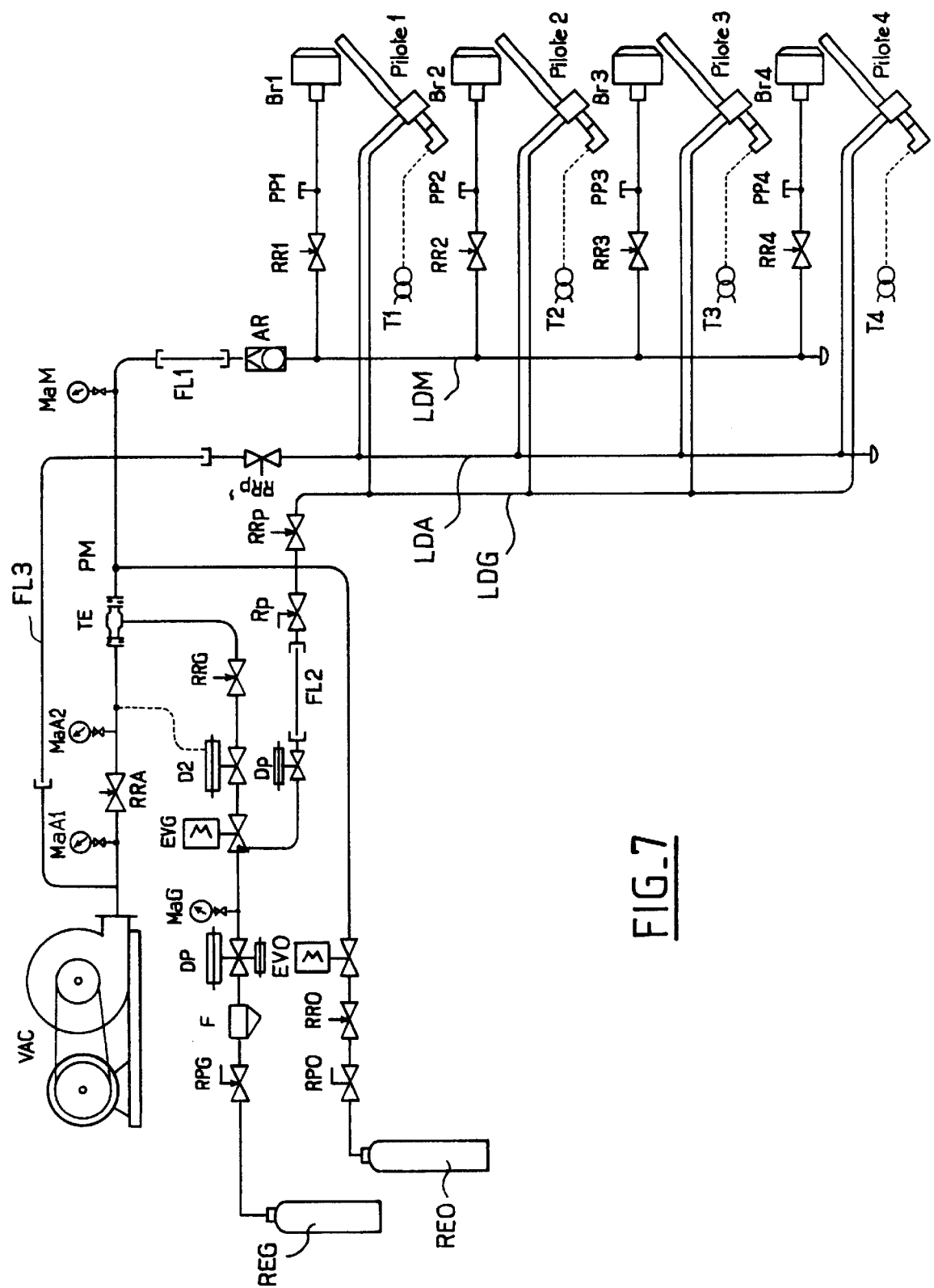
FIG. 7 is a block diagram of the entire installation comprising the fatigue test bed.

FIG. 7 shows a unit VAC possessing a pressurizing fan that delivers air under pressure, having its outlet connected to an air flow rate control valve RRA. The outlet from the valve is connected to a mixing T-piece TE. Pressure gauges MaA1 and MaA2 serve to monitor air pressure upstream and downstream from the valve RRA.

There can also be seen a natural gas supply REG and an oxygen supply REO (pressurized cylinders). The supply REG is connected to a quarter-turn valve RPG that provides proportional adjustment and that has its outlet connected via a filter F to a conventional expander DP. A natural gas pressure gauge MaG monitors the outlet pressure of the natural gas. The outlet from the expander DP is connected to the inlet of an on/off solenoid valve EVG for controlling natural gas and suitable for being controlled by the control station SP. The outlet of this solenoid valve is connected to another expander D2 whose outlet is connected via a valve RRG for adjusting the flow rate of natural gas to the other inlet of the mixing T-piece TE.

The oxygen supply REO is connected to a quarter-turn valve RPO for providing proportional adjustment whose outlet is connected to an on/off solenoid valve EVO for controlling oxygen from the station SP. The outlet from this solenoid valve is connected directly to a mixing point PM on the duct situated at the outlet from the mixing T-piece TE so as to feed the four burners Br1 to Br4 in parallel.

The pressure at the mixing point PM is verified by a mixture pressure gauge MaM, and the mixing point is connected to the test bed by a hose FL1 whose opposite end is connected via a check valve AR to a mixture distribution line LDM which is connected to the four burners Br1 to Br4 (for the cylinder head of a four-cylinder engine) via respective flow rate adjustment valves RR1 to RR4. Pressure take-off points PP1 to PP4 make it possible while setting up the test bed or while inspecting it, to verify the pressure at the inlet of each burner.

In association with each burner, the system also has a respective pilot flame Ve1 to Ve4, which pilots are fed in parallel as follows: natural gas is taken from the inlet of the solenoid valve EVG and is connected to a line LDG for feeding gas to the pilots via an expander Dp, a hose FL2, a proportional adjustment valve Rp, and a flow rate adjustment valve RRp. This distribution line feeds the gas inlets of the pilots Ve1 to Ve4.

Furthermore, air is taken from the outlet of the pressurizing fan VAC and applied via a hose FL3 and an air flow rate adjustment valve RRp' to a line LDA for distributing air to the pilots and which feeds the air inlets of the pilots.

The pilots are also associated with ignition transformers T1 to T4 making it possible when starting up the test bed and in the event of a pilot going out accidentally to relight them by means of a spark, in conventional manner.

The various proportional adjustment valves and flow rate adjustment valves serve, when setting up the test bed as described below, to ensure that the burners receive a fuel mixture of composition and pressure suitable for delivering the desired heat fluxes to the zones concerned of the cylinder head, as mentioned above. In a variant embodiment, each burner can be fed using adjustment solenoid valves or the like so as to adjust the heat flux more closely to the reference value by feedback (as applies in particular to drift).

To perform a test on a cylinder head, the control station SP controls merely the two solenoid valves EVG and EVO so that when open a flame is established at each burner (heating stage) and when closed, the flame goes out (cooling stage).

During a heating stage, the control station establishes the flame as described above and also switches the test bed to the hot cooling liquid, which liquid has already been heated (to around 100° C.) during preceding heating stages.

This hot stage takes place over a duration that makes it possible to reach the intended temperatures as marked in FIG. 6, in particular in the inter-seat bridge zones (shaded in FIG. 6), and the details given above concerning the burners and how they are fueled makes it possible to reach these temperatures after about 20 s to 100 s (typically in about 40 s) from the beginning of heating, which is only a fraction of the duration required on a prior art test bed. It should be observed at this point that circulating a cooling liquid that is already hot during this stage contributes to obtaining the above-mentioned short durations.

During this heating stage, and in accordance with an essential characteristic of the present invention, the heat delivered by the burners, as adjusted by adjusting the natural gas and oxygen mixture as described above, is determined not by monitoring the temperatures at the tops of the cylinders, but merely by monitoring the heat fluxes measured by the respective sensors 171, i.e. the quantity of heat delivered by the corresponding burners.

The mixture supplied to the burners is adjusted so as to obtain a heat flux that is essentially constant and close to a given reference value as described above. This flux can be selected to lie in a given range, e.g. from about 250 kW/$m^2$ to 1250 kW/$m^2$, so as to correspond to various types of engine and to various powers.

The cooling stage consists in closing the solenoid valves EVG and EVO and in switching the cylinder head to the cooling circuit (e.g. tap water which is typically at a temperature of about 15° C.), this stage typically extending for a duration similar to that of the heating stage.

Advantageously, the reference flux value during the heating stage is stored in the control station and is established by a calibration process for the test bed which consists initially in placing the cylinder head fitted with instruments as described above with reference to FIG. 6 on the engine test bed so that by analyzing the temperatures measured by its sensors, temperature maps can be drawn up under various operating conditions (engine speeds). Thereafter, the cylinder head fitted with instruments is removed from the engine test bed and is fitted with the above-described heat flux sensors and is mounted on the heat fatigue test bed, after which the configuration of the burners and the characteristics of the fuel mixture they receive (essentially composition and pressure) are adjusted incrementally so that the burners lead to the temperatures sensed by the thermocouples on the cylinder head stabilizing on values that are as close as possible to the corresponding values of the temperature maps drawn up using the engine test bed (preferably to within ±10° C.).

A set of heat flux values is thus determined suitable for simulating different operating conditions of the engine, and the control station can then, on demand, adjust the feed to the burners so as to obtain any of these flux values as accurately as possible.

The thermal fatigue test bed is thus calibrated and thereafter cylinder heads that are not fitted with instruments other than the flux sensors can be tested during the development process.

It is important to observe at this point that by controlling heating in the test bed of the present invention on the basis of heat flux and not on the basis of temperature, it is guaranteed that an excellent model will be obtained of real behavior on an engine test bed, and in particular that temperatures will vary in a manner that is close to that observed on the engine test bed.

Thus, if cylinder heads are tested that have different shapes, in particular concerning the ducts for cooling liquid, thereby having an influence on the way heat is removed from the cylinder heads, the test bed of the present invention makes it possible, contrary to temperature control, to ensure that these changes concerning the quality of cooling are properly reflected by corresponding changes in the temperature of the cylinder head. Thus, the test bed of the present invention will indeed observe any progress achieved in cooling due to the design of the cylinder head, and in particular any progress leading to reduced heating of the inter-seat bridges, and thus to reducing thermal fatigue.

The cooling stage is performed by turning off the flame so that with the assistance of the cooling circuit the cylinder top zones in the cylinder head drop in temperature down to about 50° C. in the inter-seat bridges, and that likewise is obtained in a duration of about 20 s to 100 s (typically about 40 s).

FIG. 8 has curves C1 to C4 showing heat flux as measured in each cylinder top during a particular heating stage. These fluxes reach a given value that reproduces real operating conditions, and the flames are turned off after a predetermined duration, in this case about 40 seconds. This behavior is advantageously displayed on a screen by the control station so as to enable the operator to verify that the flux has indeed reached the reference value.

It can be seen here that the duration of the heating stage is determined during the calibration process and is selected so as to enable the temperatures measured on the cylinder head fitted with instruments to reach values previously determined on an engine test bed, as described above.

FIG. 9 shows how temperature varies, as measured using the various thermocouples in the cylinder head fitted with instruments on the test bed of the invention during the calibration stage. It can be seen that by adjusting the characteristics of the burner, the way these temperatures vary is different from one point to another, thus complying with the desired temperature map.

Naturally, the present invention is not limited to the embodiment described above and shown in the drawings, and the person skilled in the art can make any variations or modifications thereto within the spirit of the invention.

What is claimed is:

1. A thermal fatigue test bed for an internal combustion engine cylinder head, the test bed comprising:
    a support (14) for a cylinder head (C) having at least one cylinder top zone suitable for exposure to combustion in an engine;
    at least one burner (11) suitable for directing a flame onto said top zone; and
    at least one heat flux sensor (171) disposed in said top zone to verify that the heat flux produced by the flame is approximately equal to a reference value.

2. A test bed according to claim 1, further comprising a hot cooling liquid circuit and a cold cooling liquid circuit, and means for selectively connecting the cylinder head to one of the two circuits.

3. A test bed according to claim 2, wherein the cooling circuits are controlled so as to reproduce at least approximately real conditions of cooling fluid circulation.

4. A test bed according to any one of claims 1 to 3, wherein each burner (11) is fed with a mixture of saturated hydrocarbon gas and oxygen-enriched air.

5. A test bed according to claim 4, wherein the saturated hydrocarbon gas is natural gas.

6. A test bed according to claim 5, further comprising means for adjusting the heat flux supplied by the burners by adjusting the quantities of said natural gas and of an oxygen-enriched air in the mixture.

7. A test bed according to claim 1, wherein the flux from each burner is adjustable.

8. A test bed according to claim 7, characterized in that said reference value is selected in such a manner as to generate a temperature map at various points of the cylinder head similar to that obtained under real operating conditions and as measured by means of a cylinder head fitted with temperature sensors.

9. A test bed according to claim 8, characterized in that each burner (11) is suitable for generating a distributed flame capable of producing said temperature map in the associated cylinder top zone.

10. A test bed according to claim 9, characterized in that each burner possesses a perforated plate (112) having a predetermined distribution of orifices.

11. A test bed according to claim 10, characterized in that said distribution is non-uniform.

12. A test bed according to claim 1, wherein each heat flux sensor (171) is mounted at the end of a fuel injector (17) suitable for mounting in the cylinder head, said end being adapted to receive said sensor.

* * * * *